(12) United States Patent
Baledge (10) Patent No.: US 10,766,408 B2
(45) Date of Patent: Sep. 8, 2020

(54) SAFETY BRAKE LIGHT MODULE AND METHOD OF ENGAGING A SAFETY BRAKE LIGHT (71) Applicant: SAFELY BRAKE, INC., Fort Wayne, IN (US)

(72) Inventor: Lenny L. Baledge, Prairie Grove, AR (US)

(73) Assignee: Safely Brake, Inc., Fort Wayne, IN (US)

( * ) Notice: Subject to any disclaimer, the term of this patent is extended or adjusted under 35 U.S.C. 154(b) by 0 days.

(21) Appl. No.: 16/080,452

(22) PCT Filed: Feb. 28, 2017

(86) PCT No.: PCT/US2017/020052
§ 371 (c)(1),
(2) Date: Aug. 28, 2018

(87) PCT Pub. No.: WO2017/151686
PCT Pub. Date: Sep. 8, 2017

(65) Prior Publication Data
US 2019/0061608 A1 Feb. 28, 2019

Related U.S. Application Data (60) Provisional application No. 62/301,574, filed on Feb. 29, 2016.

(51) Int. Cl.
B60Q 1/44 (2006.01)
H05B 47/16 (2020.01)
H05B 47/155 (2020.01)

(52) U.S. Cl.
CPC ........... *B60Q 1/444* (2013.01); *H05B 47/155* (2020.01); *H05B 47/16* (2020.01); *Y02B 20/42* (2013.01)

(58) Field of Classification Search
CPC .. B60Q 1/444; H05B 37/0281; H05B 37/029; Y02B 20/42
(Continued)

(56) References Cited

U.S. PATENT DOCUMENTS 3,576,527 A 4/1971 Howard
3,740,715 A 1/1973 Szekessy
(Continued)

OTHER PUBLICATIONS

International Search Report and Written Opinion dated May 15, 2017 in PCT/US2017/020052.
(Continued)

*Primary Examiner* — Zhen Y Wu
(74) *Attorney, Agent, or Firm* — Faegre Drinker Biddle & Reath LLP (57) ABSTRACT A safety brake light module configured to energize a safety brake light of a vehicle and a method of energizing the safety brake light with the safety brake light module. The safety brake light module comprises a controller; and a power circuit communicatively coupled to the controller and adapted to be electrically coupled to the safety brake light; the controller comprising processing instructions configured to generate a safety brake light signal configured to cause the safety brake light to illuminate in an illumination pattern based thereon, wherein during a second braking event the illumination pattern only a constant portion when the time duration between a first braking event and the second braking event does not exceed the first predetermined time period.

18 Claims, 9 Drawing Sheets (58) Field of Classification Search
USPC .......................................................... 340/479
See application file for complete search history.

(56) References Cited

U.S. PATENT DOCUMENTS

| | | | |
|---|---|---|---|
| 3,760,353 A | 9/1973 | Hassinger | |
| 3,781,677 A | 12/1973 | Hagen | |
| 3,846,749 A | 11/1974 | Curry | |
| 3,914,739 A | 10/1975 | Caughlin et al. | |
| 4,107,647 A | 8/1978 | Yoshino | |
| 4,231,103 A | 10/1980 | Freeman et al. | |
| 4,403,210 A | 9/1983 | Sullivan | |
| 4,651,129 A | 3/1987 | Wood et al. | |
| 4,871,945 A | 10/1989 | Smith et al. | |
| 4,876,525 A | 10/1989 | Gross | |
| 4,956,633 A | 9/1990 | Waterson et al. | |
| 4,983,952 A | 1/1991 | Athalye | |
| 4,987,405 A | 1/1991 | Jakobowski | |
| 5,001,398 A | 3/1991 | Dunn | |
| 5,028,908 A | 7/1991 | Juang | |
| 5,111,182 A | 5/1992 | Ishikawa et al. | |
| 5,172,095 A | 12/1992 | Scott | |
| 5,231,373 A | 7/1993 | Freeman et al. | |
| 5,345,218 A | 9/1994 | Woods et al. | |
| 5,404,130 A | 4/1995 | Lee et al. | |
| 5,442,333 A | 8/1995 | Bailey | |
| 5,444,620 A | 8/1995 | Yeh | |
| 5,565,841 A | 10/1996 | Pandohie | |
| 5,598,066 A | 1/1997 | Wiesemann | |
| 5,606,308 A | 2/1997 | Pinkowski | |
| 5,606,310 A | 2/1997 | Egger et al. | |
| 5,677,670 A | 10/1997 | Gangloff | |
| 5,680,098 A | 10/1997 | Bejster | |
| 5,713,654 A | 2/1998 | Scifres | |
| 5,717,377 A | 2/1998 | Gao | |
| 5,736,926 A | 4/1998 | Winholtz | |
| 5,747,937 A | 5/1998 | Wiesemann | |
| 5,770,998 A | 6/1998 | Choi | |
| 5,801,624 A | 9/1998 | Tilly | |
| 5,838,259 A | 11/1998 | Tonkin | |
| 5,847,513 A | 12/1998 | Host | |
| 5,850,177 A | 12/1998 | Zimmerman | |
| 5,909,174 A | 1/1999 | Dietz et al. | |
| 5,894,265 A | 4/1999 | Hemingway | |
| 5,952,917 A | 9/1999 | Zimmermann | |
| 6,018,295 A * | 1/2000 | Jewell | B60Q 1/32 340/464 |
| 6,020,814 A | 2/2000 | Robert | |
| 6,023,221 A | 2/2000 | Michelotti | |
| 6,025,775 A | 2/2000 | Erlandson | |
| 6,100,799 A | 8/2000 | Fenk | |
| 6,111,500 A | 8/2000 | Wilson | |
| 6,150,933 A | 11/2000 | Matsumoto | |
| 6,152,588 A | 11/2000 | Scifres | |
| 6,160,476 A | 12/2000 | Ponziani | |
| 6,175,305 B1 | 1/2001 | Johnson et al. | |
| 6,249,219 B1 | 6/2001 | Perez et al. | |
| 6,268,792 B1 | 7/2001 | Newton | |
| 6,278,364 B1 | 8/2001 | Robert | |
| H2001 H | 11/2001 | Pinkus | |
| 6,351,211 B1 | 2/2002 | Bussard | |
| 6,417,767 B1 | 7/2002 | Carlson et al. | |
| 6,426,696 B1 | 7/2002 | Ortega | |
| 6,456,206 B1 | 9/2002 | Rocca | |
| 6,491,420 B1 | 12/2002 | Scifres | |
| 6,525,478 B2 | 2/2003 | Schmitt | |
| 6,628,197 B1 | 9/2003 | Poguntke | |
| 6,677,855 B2 | 1/2004 | Engelman | |
| 6,686,836 B1 | 2/2004 | Albert | |
| 6,693,526 B1 | 2/2004 | Puccio | |
| 6,710,709 B1 | 3/2004 | Morin et al. | |
| 6,720,871 B2 | 4/2004 | Boyer et al. | |
| 6,744,359 B1 | 6/2004 | Wasilewski | |
| 6,744,361 B1 * | 6/2004 | Maddox | B60Q 1/44 340/467 |
| 6,765,483 B1 | 7/2004 | Naqvi | |
| 6,781,073 B1 | 8/2004 | Altmann | |
| D495,812 S | 9/2004 | Hilborn | |
| 6,799,873 B2 | 10/2004 | Fox | |
| 6,808,300 B2 | 10/2004 | Fellhauer | |
| 6,864,786 B2 | 3/2005 | Speckhart et al. | |
| 6,871,992 B2 | 3/2005 | Kim | |
| 6,888,452 B1 | 5/2005 | Gerhaher | |
| 6,911,905 B2 | 6/2005 | Carlson et al. | |
| 6,943,677 B2 | 9/2005 | Boyer et al. | |
| 6,946,955 B2 | 9/2005 | Golder | |
| 7,019,632 B2 | 3/2006 | Cole | |
| 7,075,423 B2 | 7/2006 | Currie | |
| D529,642 S | 10/2006 | Green | |
| 7,116,294 B2 | 10/2006 | Stopa | |
| 7,235,767 B2 | 6/2007 | Gutbrod | |
| RE39,730 E | 7/2007 | Brown | |
| 7,268,679 B2 | 9/2007 | Garcia Briz | |
| 7,319,932 B2 | 1/2008 | Thorne | |
| 7,400,238 B2 | 7/2008 | Clark | |
| 7,468,656 B1 | 12/2008 | Frank | |
| 7,495,550 B2 | 2/2009 | Huang | |
| 7,525,418 B2 | 4/2009 | Tsai | |
| 7,573,378 B2 | 8/2009 | Matsumoto | |
| 7,710,254 B1 | 5/2010 | Hill, III | |
| 7,755,474 B2 | 7/2010 | Singh | |
| 7,755,475 B2 | 7/2010 | Toelge | |
| 7,768,385 B1 * | 8/2010 | Juranovich | B60Q 1/46 340/10.1 |
| 7,774,137 B2 | 8/2010 | Thorne | |
| 7,782,185 B1 | 8/2010 | Burns | |
| 7,808,376 B2 | 10/2010 | Terzian | |
| 7,834,751 B2 | 11/2010 | Tewari | |
| 7,893,823 B2 | 2/2011 | Morales | |
| 7,932,817 B2 | 4/2011 | Chen | |
| 7,982,594 B2 | 7/2011 | Singh | |
| 8,050,836 B2 | 11/2011 | Karnjate | |
| 8,053,690 B2 | 11/2011 | Jang | |
| 8,120,273 B2 | 2/2012 | Edwards | |
| 8,126,613 B2 | 2/2012 | Wohltmann | |
| 8,192,063 B2 | 2/2012 | Neufeglise | |
| 8,144,004 B2 | 3/2012 | Polak et al. | |
| 8,217,778 B1 | 7/2012 | Kirkman | |
| 8,441,347 B2 * | 5/2013 | Marlowe | B60Q 1/445 340/440 |
| 8,482,397 B1 | 7/2013 | Tajiri | |
| 8,547,219 B2 | 10/2013 | Kisiel | |
| 8,588,997 B2 | 11/2013 | Pribula | |
| 8,690,403 B2 | 4/2014 | Saxena | |
| 8,700,285 B2 | 4/2014 | Barlsen | |
| 8,721,147 B2 | 5/2014 | Lunsford | |
| 8,845,159 B2 | 9/2014 | Dolan | |
| 8,870,427 B2 | 10/2014 | Fleischer | |
| 8,888,339 B2 | 11/2014 | Rampf | |
| 8,907,780 B2 | 12/2014 | Rohr | |
| 8,911,027 B2 | 12/2014 | Walser | |
| 8,928,475 B2 | 1/2015 | Bement | |
| 8,933,800 B1 | 1/2015 | Biles | |
| 8,941,482 B1 | 1/2015 | Gouverneur | |
| D723,200 S | 2/2015 | Shelton | |
| 8,975,532 B2 | 3/2015 | Friedrich | |
| 8,981,922 B2 | 3/2015 | Israel | |
| 8,992,057 B2 | 3/2015 | Foley | |
| 9,090,203 B2 | 7/2015 | Seifert | |
| 9,139,131 B2 | 9/2015 | Jones et al. | |
| 9,156,460 B2 | 10/2015 | Clark | |
| 9,168,863 B2 | 10/2015 | Piersing | |
| 9,176,924 B2 | 11/2015 | Ricci | |
| 9,181,895 B2 | 11/2015 | Roberts | |
| 9,187,030 B1 | 11/2015 | Vaughn | |
| 9,227,561 B2 | 1/2016 | Burgdorf | |
| 9,238,432 B1 | 1/2016 | Jameson | |
| 9,240,276 B2 | 1/2016 | Dynes | |
| 9,242,595 B2 | 1/2016 | Lim et al. | |
| 9,260,095 B2 | 2/2016 | Chundrlik, Jr. et al. | |
| 9,302,614 B2 | 4/2016 | Olson et al. | |
| 9,475,424 B2 | 10/2016 | Olson et al. | |
| 9,509,065 B2 | 11/2016 | Olson et al. | |
| 9,592,763 B2 | 3/2017 | Christian | |

(56) References Cited

U.S. PATENT DOCUMENTS

| | | | |
|---|---|---|---|
| 9,643,533 B1* | 5/2017 | Houss | B60Q 1/343 |
| 2002/0105423 A1* | 8/2002 | Rast | B60Q 1/44 |
| | | | 340/479 |
| 2003/0030555 A1 | 2/2003 | Cole | |
| 2003/0097477 A1 | 5/2003 | Vossler | |
| 2003/0164035 A1 | 9/2003 | Nantz et al. | |
| 2004/0051635 A1 | 3/2004 | Lu | |
| 2004/0052086 A1 | 3/2004 | Hadar | |
| 2004/0155844 A1 | 8/2004 | Stopa | |
| 2004/0183462 A1 | 9/2004 | Frank | |
| 2005/0156727 A1 | 7/2005 | Golder | |
| 2006/0061466 A1 | 3/2006 | Garcia Briz | |
| 2006/0091817 A1* | 5/2006 | Herrig | B60Q 1/34 |
| | | | 315/200 A |
| 2006/0125616 A1* | 6/2006 | Song | B60Q 1/38 |
| | | | 340/463 |
| 2006/0158323 A1 | 7/2006 | Pattison | |
| 2006/0273236 A1 | 12/2006 | Gutbrod | |
| 2007/0016348 A1 | 1/2007 | Long | |
| 2007/0241874 A1* | 10/2007 | Okpysh | B60Q 1/444 |
| | | | 340/479 |
| 2007/0242339 A1* | 10/2007 | Bradley | B60Q 1/0017 |
| | | | 359/237 |
| 2008/0111673 A1* | 5/2008 | Roberts | B60Q 1/2657 |
| | | | 340/479 |
| 2008/0122607 A1* | 5/2008 | Bradley | B60Q 1/0017 |
| | | | 340/468 |
| 2008/0238648 A1* | 10/2008 | Tewari | B60Q 1/444 |
| | | | 340/469 |
| 2008/0297338 A1 | 12/2008 | Singh | |
| 2008/0309478 A1 | 12/2008 | Morales | |
| 2010/0066528 A1 | 3/2010 | Kim | |
| 2010/0102946 A1 | 4/2010 | Polak | |
| 2010/0238016 A1 | 9/2010 | Singh | |
| 2010/0332101 A1* | 12/2010 | Braunberger | B60Q 1/447 |
| | | | 701/96 |
| 2011/0181197 A1 | 7/2011 | Kanda et al. | |
| 2012/0185130 A1* | 7/2012 | Ekchian | B60Q 1/2603 |
| | | | 701/36 |
| 2013/0190972 A1* | 7/2013 | Pribula | B60Q 1/44 |
| | | | 701/36 |
| 2013/0321143 A1* | 12/2013 | Boyer | B60Q 1/44 |
| | | | 340/463 |
| 2014/0253315 A1* | 9/2014 | Bement | B60Q 1/447 |
| | | | 340/479 |
| 2014/0333426 A1* | 11/2014 | Christian | B60Q 1/44 |
| | | | 340/469 |
| 2014/0361687 A1* | 12/2014 | Olson | B60Q 1/44 |
| | | | 315/80 |
| 2015/0360603 A1* | 12/2015 | Miner | B60Q 1/44 |
| | | | 340/479 |

OTHER PUBLICATIONS

International Preliminary Report on Patentability from related international application PCT/US2017/020052, dated Sep. 4, 2018, 7 pages.

* cited by examiner

SAFETY BRAKE LIGHT MODULE AND METHOD OF ENGAGING A SAFETY BRAKE LIGHT

CROSS-REFERENCE TO RELATED APPLICATIONS

The present application is U.S. national stage application filed under 35 U.S.C. § 371 of International Application No. PCT/US2017/020052, filed on Feb. 28, 2017, which claims the benefit of U.S. Provisional Application No. 62/301,574, filed on Feb. 29, 2016, which is incorporated by reference herein in its entirety.

FIELD OF THE INVENTION

The present invention relates generally to the field of vehicular lighting controls, and more particularly to methods and devices to control vehicular brake lights.

BACKGROUND

Safety brake lights or "third" brake lights are used in vehicles to provide an enhanced warning to following vehicles when the vehicle stops. The safety brake light is generally activated responsive to the activation of the brake pedal. A circuit may be provided in some vehicles to pulsate or flash the safety brake light upon braking to alert the following drivers. The safety brake light is generally located facing backwards and between the right and left turning signal lights, and above the rear end of the vehicle.

SUMMARY OF CLAIMED EMBODIMENTS

The present disclosure provides a safety brake light module configured to energize a safety brake light of a vehicle. In one embodiment, the safety brake light module comprises a voltage regulation circuit; a controller powered by the regulation circuit; a power circuit coupled to the controller and having an output contact adapted to be electrically coupled to the safety brake light; the controller comprising processing instructions configured to generate a safety brake light signal configured to cause the safety brake light to generate an illumination pattern based thereon, the illumination pattern comprising a pulsing portion and a constant portion when a time duration between sequential braking events exceeds a first predetermined time period, and the illumination pattern comprising only a constant portion when the time duration between the sequential braking events does not exceed the first predetermined time period.

In another embodiment, the safety brake light module comprises a voltage regulation circuit; a controller powered by the regulation circuit; a power circuit coupled to the controller and having an output contact adapted to be electrically coupled to the safety brake light; the controller comprising processing instructions configured to generate a safety brake light signal configured to cause the safety brake light to generate an illumination pattern based thereon, the illumination pattern comprising a pulsing portion and a constant portion, and the processing instructions further configured to initiate the safety brake light signal responsive to a braking signal in the absence of a deceleration event and also to initiate the safety brake light signal responsive to the deceleration event.

In a further embodiment the safety brake light module comprises a controller; and a power circuit communicatively coupled to the controller and adapted to be electrically coupled to the safety brake light; the controller comprising processing instructions configured to generate a safety brake light signal configured to cause the safety brake light to illuminate in an illumination pattern based thereon, wherein during a second braking event the illumination pattern only a constant portion when the time duration between a first braking event and the second braking event does not exceed the first predetermined time period. In some embodiments, a method of operating a safety brake light of a vehicle comprises actuating a vehicle brake actuator of the vehicle; and energizing a safety brake light module as in the foregoing module.

Additional features, advantages, and embodiments of the present disclosure may be set forth from consideration of the following detailed description, figures, and claims. Moreover, it is to be understood that both the foregoing summary of the present disclosure and the following detailed description describe examples and intended to provide further explanation without further limiting the scope of the claims.

BRIEF DESCRIPTION OF THE FIGURES

The accompanying figures illustrate embodiments of the present disclosure and, together with the detailed description, serve to explain the principles of the invention. In the figures, like reference characters generally refer to like features (e.g., functionally similar and/or structurally similar elements).

DETAILED DESCRIPTION

In the following detailed description, reference is made to the accompanying figures, which form a part hereof. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be performed, arranged, substituted, combined, and designed in a wide variety of different configurations.

The embodiments described below relate to methods and devices to control vehicular brake lights. More specifically, the methods and devices pertain to control of a safety brake light that may operate independently from the right and left turn signal lights of a vehicle. Typically, the safety brake light is mounted on the vehicle's centerline. Some embodiments of the invention pertain to brake light pulsation circuits that can be packaged in modules configured to retrofit a vehicle. Many vehicles merely engage the safety brake lights with a constant illumination pattern, where the intensity of the illumination pattern does not change while the brakes are applied. These vehicles can be retrofitted by inserting into the safety brake light circuit a safety brake light module including the safety brake light circuits described below. Embodiments of the method of controlling the safety brake lights implemented by such modules can also be incorporated into new vehicles. To that end, some embodiments of the invention pertain to brake light pulsation circuits integrated into new vehicles. Embodiments of the method of controlling the safety brake lights implemented by such modules can also be incorporated into on-board controllers of new vehicles and implemented using a vehicle area network of the vehicle coupling various sensors of the vehicle with the on-board controllers. As used herein, on-board controllers include single devices and multiple devices electronically coupled to each other and/or the vehicle area network, as is known in the art. An on-board controller may be programmed to output a safety brake light signal comprising first, second and third portions as claimed, in which case a safety brake light module is not required.

Figure 1:
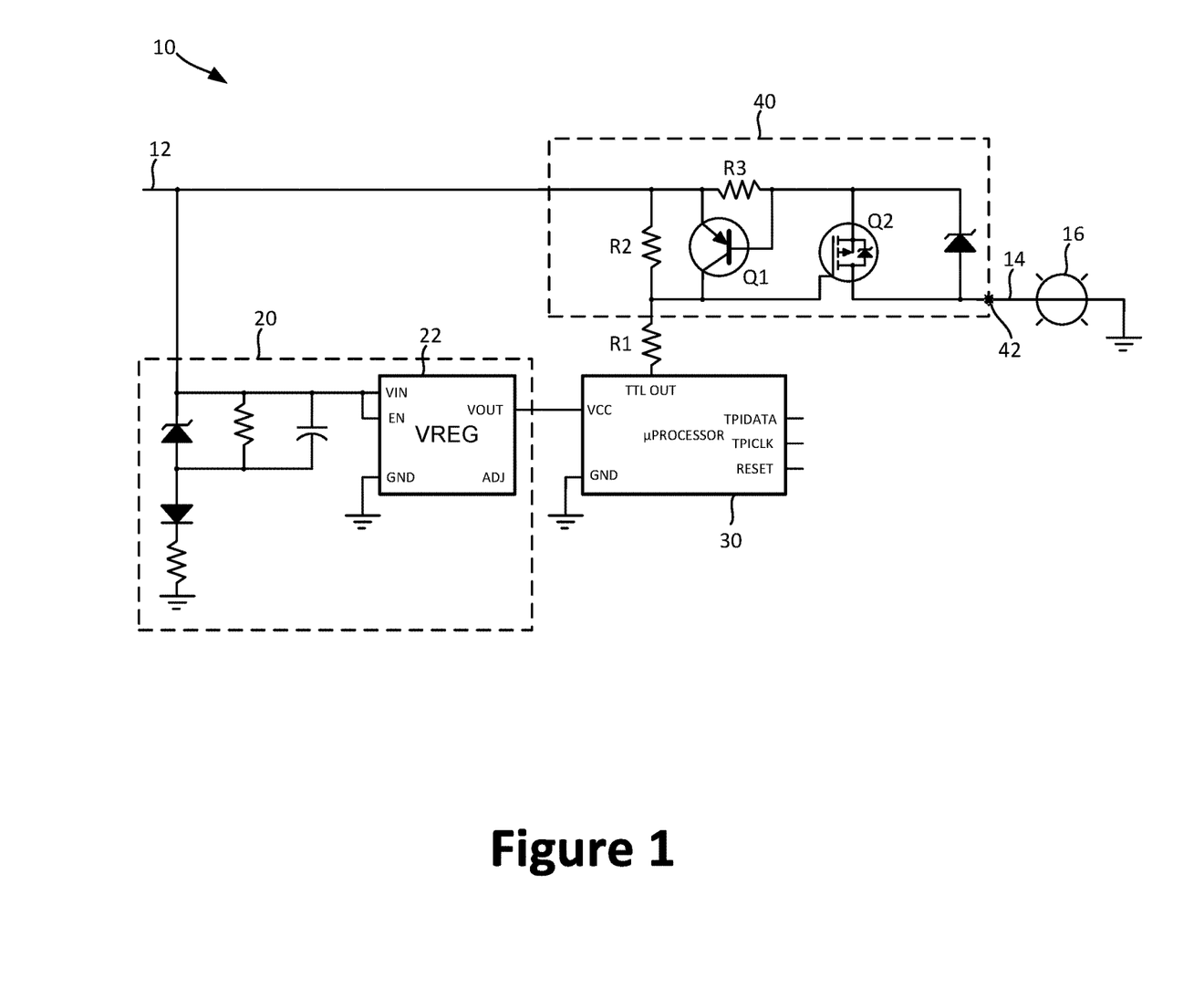
FIG. 1 is a schematic diagram of an embodiment of a safety brake light pulsation circuit.

Referring now to FIG. 1, an embodiment of a safety brake light pulsation circuit 10 is provided which is powered by a brake signal received on a brake signal conductor 12. A safety brake light pulsation circuit may also be referred to a safety brake light module. Safety brake light pulsation circuit or module 10 includes a safety brake light signal conductor 14 electrically coupled to a safety brake light 16. Brake light pulsation circuit 10 is structured to energize safety brake light 16 responsive to braking. As used herein, "safety brake light" includes any device configured to illuminate upon receipt of electrical energy, including an incandescent bulb, a light emitting diode, or many of them in combination or in aggregate. Brake light pulsation circuit 10 comprises a voltage regulation circuit 20, a microprocessor 30, and a power circuit 40, all energized by the brake signal, which varies between approximately 0 volts when the brake is disengaged and 14 volts when the brake is engaged. An on-board controller of the vehicle may monitor the electrical current on brake signal conductor 12 and, responsive thereto, may indicate a fault if the electrical current is less than expected. The electrical current may be less than expected if, for example, safety brake light 16 burns out or fails to function for any other reason.

Voltage regulation circuit 20 comprises a voltage regulator 22 and ancillary passive electrical devices provided to reduce and stabilize or condition the brake signal. Passive electrical devices include resistors, diodes, Zener diodes, inductors, and capacitors. Conditioning protects voltage regulator 22 in case the brake signal transmits voltage spikes and other signals that could damage voltage regulator 22. Voltage regulator 22 outputs a regulated voltage VOUT, typically about 3.5 volts, provided to microprocessor 30. Microprocessor 30 is programmed with processing instructions to energize safety brake light 16 in one or more illumination patterns responsive to braking and in accordance with patterns output via a TTL OUT contact. Exemplary lighting patterns 80, 82, 84, 88 and 90 are shown on FIGS. 7-11. In the present example, microprocessor 30 is shown including programming contacts labeled TPIDATA, TPICLK and RESET. A suitable cable can be connected between a computer and contacts TPIDATA, TPICLK and RESET of microprocessor 30 to embed the processing instructions in microprocessor 30. As used herein, processing instructions include a single application, a plurality of applications, one or more programs or subroutines, software, firmware, and any variations thereof suitable to execute instruction sequences with a processing device. Microprocessor 30 is a specific example of a more general controller. The controller may be a single device or a distributed device, and the functions of the controller may be performed by processing instructions embedded or stored in non-transient machine readable storage media. Example controllers include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device. The controller may form a portion of a processing subsystem including one or more instruction processing devices having non-transient computer readable storage media, processors or processing circuits, and communication hardware.

Power circuit 40 comprises a transistor Q1 and a metal-oxide-semiconductor field-effect transistor (MOSFET) Q2. Resistors R1, R2, and R3 condition the voltage level of the brake signal to levels suitable to transistor Q1, and MOSFET Q2, such that pulsation of the TTL OUT signal causes safety brake light 16 to generate an alternating illumination pattern. Safety brake light 16 is connected to an output node 42 of power circuit 40.

Figure 2:
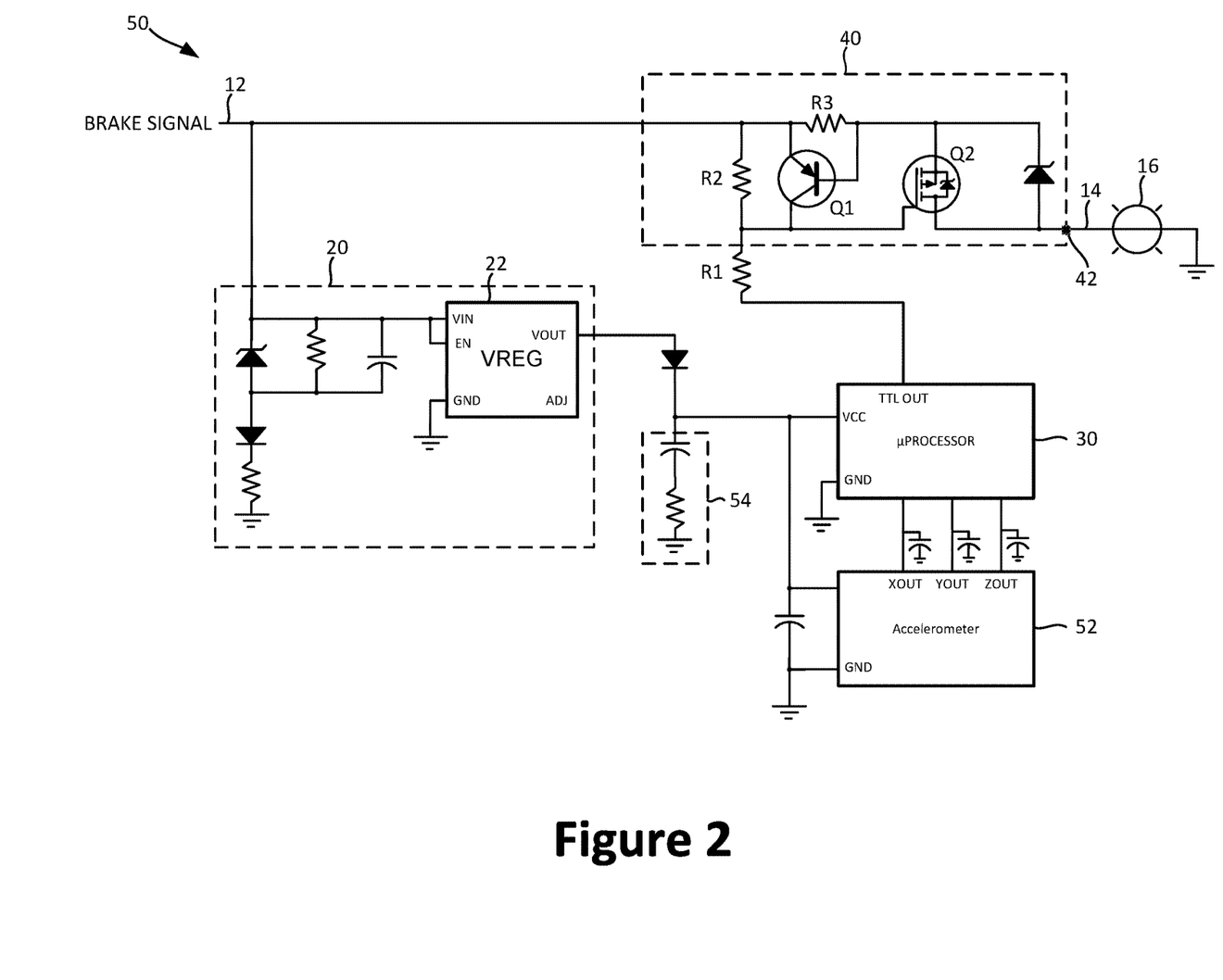
FIG. 2 is a schematic diagram of another embodiment of a safety brake light pulsation circuit.

FIG. 2 is a schematic diagram of another embodiment of a safety brake light pulsation circuit, denoted by numeral 50. Safety brake light pulsation circuit 50 is similar in functionality and structure to brake light pulsation circuit 10, and additionally includes an accelerometer 52 and an energy storage circuit 54. An example energy storage circuit 54 comprising a resistor-capacitor (RC) circuit is shown. A battery is another example energy storage circuit 54. Energy storage circuit 54 energizes microprocessor 30 and accelerometer 52 when braking is not applied, until the energy stored by energy storage circuit 54 is depleted or reaches a minimum voltage threshold below which microprocessor 30 does not function. Thus, microprocessor 30 can be programmed to detect rapid deceleration of the vehicle, indicated by accelerometer 52, while the brakes are not being applied, as described with reference to FIG. 11. Energy storage circuit 54 may comprise a resistor and a non-electrolytic capacitor defining an RC value of energy storage circuit 54. Controller 30 may read a voltage of energy storage circuit 54 and determine from the voltage a time elapsed between braking events, during which time controller 30 may be de-energized. Advantageously, a non-electrolytic capacitor is small and therefore the size of the module can be reduced such that the module fits inside an existing safety light housing.

Accelerometer 52 comprises three-dimensional orthogonal outputs XOUT, YOUT, and ZOUT. The accelerometer outputs are received and processed by microprocessor 30 to extract an deceleration value indicative of the rate at which the vehicle is decelerating. Deceleration thresholds can be programmed to trigger various responses, including pulsing the safety brake light even before the driver begins to apply the brakes. This feature may be advantageous in a situation where the vehicle is stopped without application of the brakes, such us in the event of an accident, to signal a following vehicle of the stopping event. As used herein, a deceleration event comprises an event during which a deceleration value exceeds a threshold. The value may be provided by a sensor or determined by the controller based on various values of parameters such as global position, speed, and time. Generally, the threshold is determined to trigger a desired response. In one example, the threshold is set to indicate a deceleration event when deceleration is abrupt enough to correlate to substantial stoppage of forward motion. In another example, the threshold is set to indicate a deceleration event when the vehicle reduces speed by at least 0.5 miles per hour in less than 0.2 seconds. In another example, the threshold is set to indicate a deceleration event when the vehicle reduces speed by at least 0.5 miles per hour in less than 0.3 seconds.

In one variation of the present embodiment, accelerometer 52 has to be positioned in a predetermined orientation with respect to the centerline of the vehicle. The predetermined orientation reduces the computational costs of determining deceleration in the direction of movement parallel to the centerline of the vehicle and to distinguish such deceleration from lateral acceleration/deceleration due to, for example, turning. In another variation of the present embodiment, accelerometer 52 (or the module containing it) can be positioned in any orientation. In the present variation, the controller (e.g. microprocessor 30) includes processing instructions configured to determine the orientation of accelerometer 52 relative to the centerline of the vehicle. In one example, the processing instructions average the orientation signals generated by accelerometer 52 to take advantage of the fact that the vehicle will most frequently move in a direction parallel to the centerline of the vehicle. Averaging out signals corresponding to right and left turns of the vehicle results in a vector indicative of the orientation of accelerometer 52. A calibration input may be provided to initiate the determination of the orientation vector of accelerometer 52, which may be accompanied by instructions to drive in a straight line upon initial use of the safety light module.

In a variation of the present embodiment, the acceleration signals from accelerometer 52 are used by the controller to determine the rate of deceleration of the vehicle, and the controller causes the pulsation rate of the illumination pattern to increase as a function of deceleration to indicate urgency to the following vehicle. The function may be continuous. The function may be step-wise discrete.

Vehicles generally include electronic circuits such as electronic control modules or on-board controllers, transmission control modules (TCM), and other circuits configured to monitor every aspect of the vehicle. These modules measure, among others, pressure, temperature, flow, engine speed, oxygen level, and exhaust emissions levels. Control modules also monitor variables to activate or actuate air bags, hill descent controls, different braking mechanisms, and other safety features. Advanced driver assistance systems (ADAS) were developed to automate/adapt/enhance vehicle safety features. These include lane, speed and park assist systems, adaptive cruise control, and blind spot detection. A vehicle area network comprising wires connecting sensors to control modules, and software protocols, allows a vehicle to utilize sensors to perform different functions without requiring duplication of the sensors. An example of a vehicle area network is a controller area network (CAN) comprising a CANbus, or CANbus. Each control unit extracts information from the CANbus using predetermined known protocols.

Figure 3:
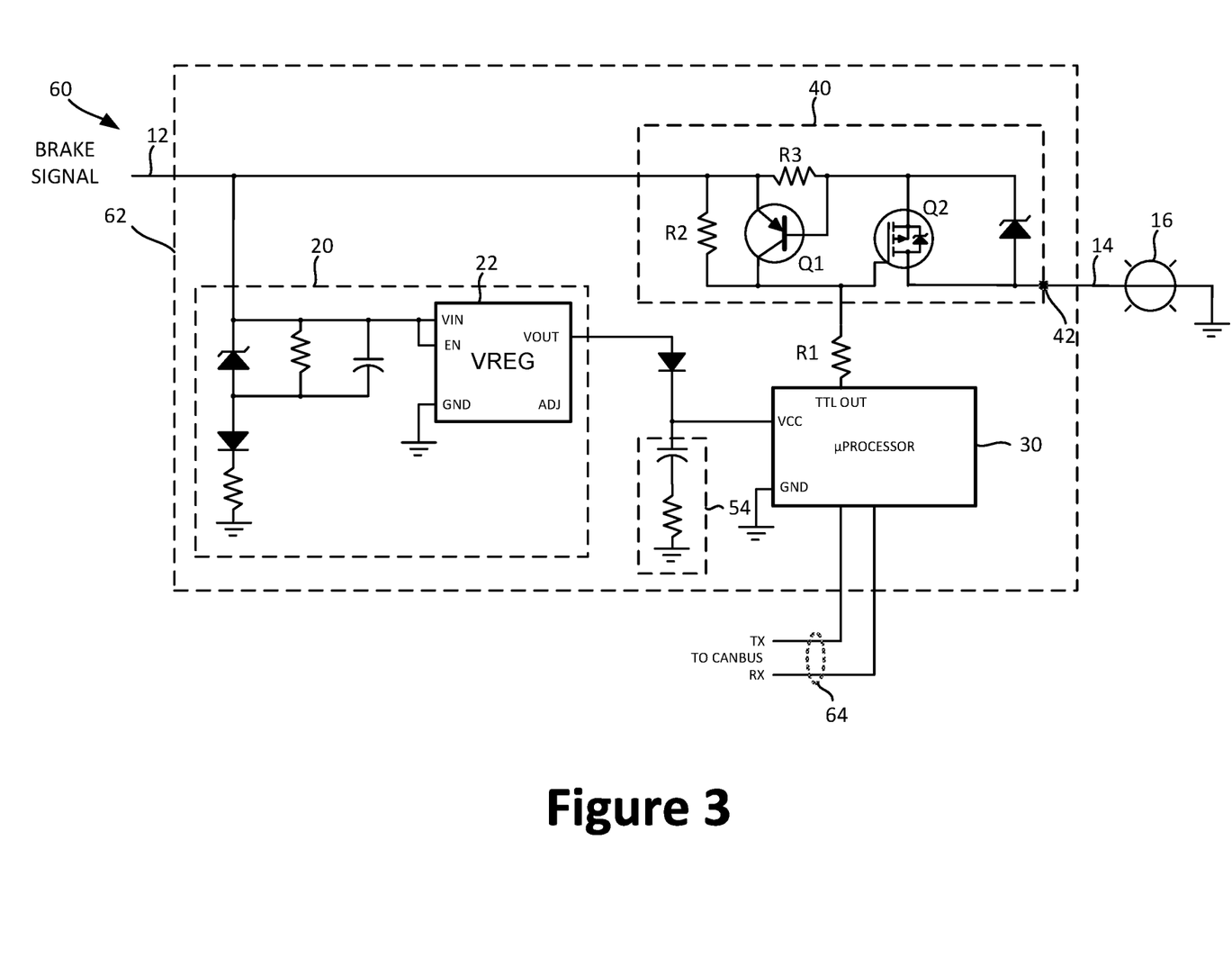
FIG. 3 is a schematic diagram of a further embodiment of a safety brake light pulsation circuit.

FIG. 3 is a schematic diagram of a further embodiment of a safety brake light pulsation circuit, denoted by numeral 60, communicatively coupled to the CANbus. Safety brake light pulsation circuit 60 is packaged in a module, denoted by numeral 62, sized to be placed inside a housing in which safety brake light 16 is placed. Brake light pulsation circuit 60 is similar in functionality and structure to safety brake light pulsation circuits 10 and 50, which may also comprise modules as described herein. Brake light pulsation circuit 60 includes CANbus connectors. The CANbus connectors are coupled to a CANbus cable 64. In this embodiment, microprocessor 30 includes processing instructions to communicate with the CANbus and obtain information therefrom, including acceleration (positive or negative), speed, status of anti-lock brakes, status of air bags, etc. Microprocessor 30 also includes processing instructions configured to engage the TTL OUT output as described previously and further below, utilizing the CANbus inputs described above, or any of them, to further determine when and how to generate an illumination pattern with the safety brake light. By reading sensor values from the CANbus to determine deceleration and other parameters indicative of the vehicle's motion, accelerometer 52 can be omitted.

In a variation of the present embodiment, a CANbus module is configured to connect to the CANbus and further comprises a wireless transceiver. Microprocessor 30 also comprises a wireless transceiver. The CANbus module and microprocessor 30 are configured to communicate wirelessly via any known protocol in lieu of a direct cable connection. Example protocols include Bluetooth, ZigBee, Wi-Fi, IrDA and WPAN. Wireless access to the CANbus is attractive in retrofit applications to preclude running cables between the CANbus and the safety brake light.

Figure 4:
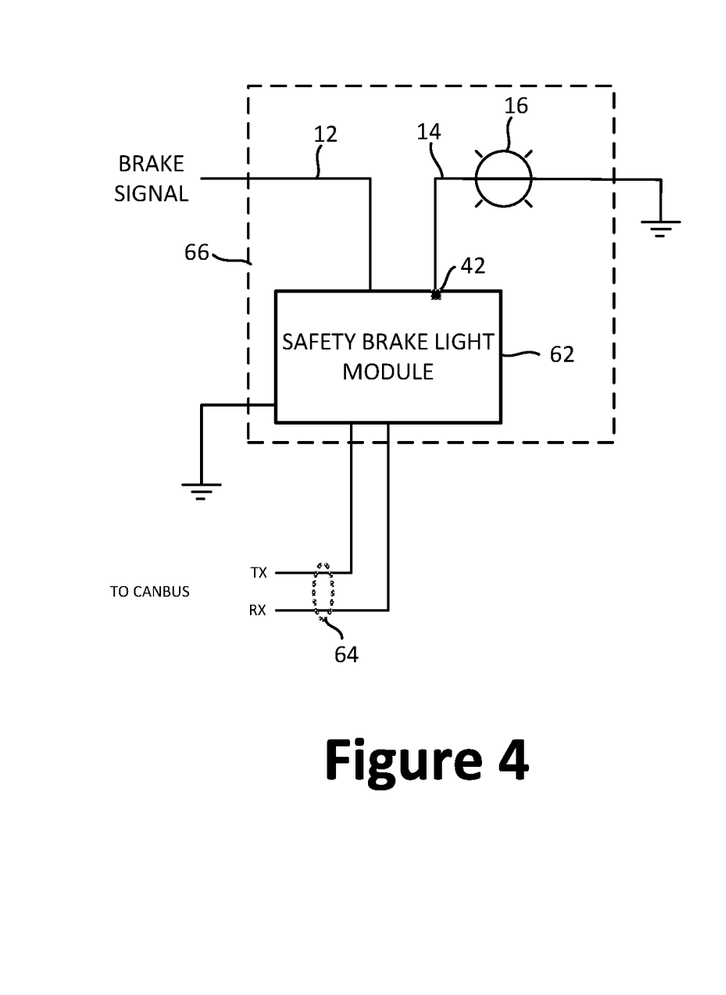
FIG. 4 is a block diagram of a safety brake light module in a housing including a safety brake light.

Referring to FIG. 4, safety brake light pulsation module 62, including any of the foregoing safety brake light pulsation circuits 10, 50, or 60, can advantageously be located adjacent to safety brake light 16 in an existing housing 66 (FIG. 4) of the vehicle, provided initially to house safety brake light 16. This placement is advantageous because it might not require routing new cables to the safety brake light. In some variations of the embodiments described above, a safety brake light module is located remotely from housing 66 and is directly connected to the CANbus and electrical power, as described below in FIG. 5.

Figure 5:
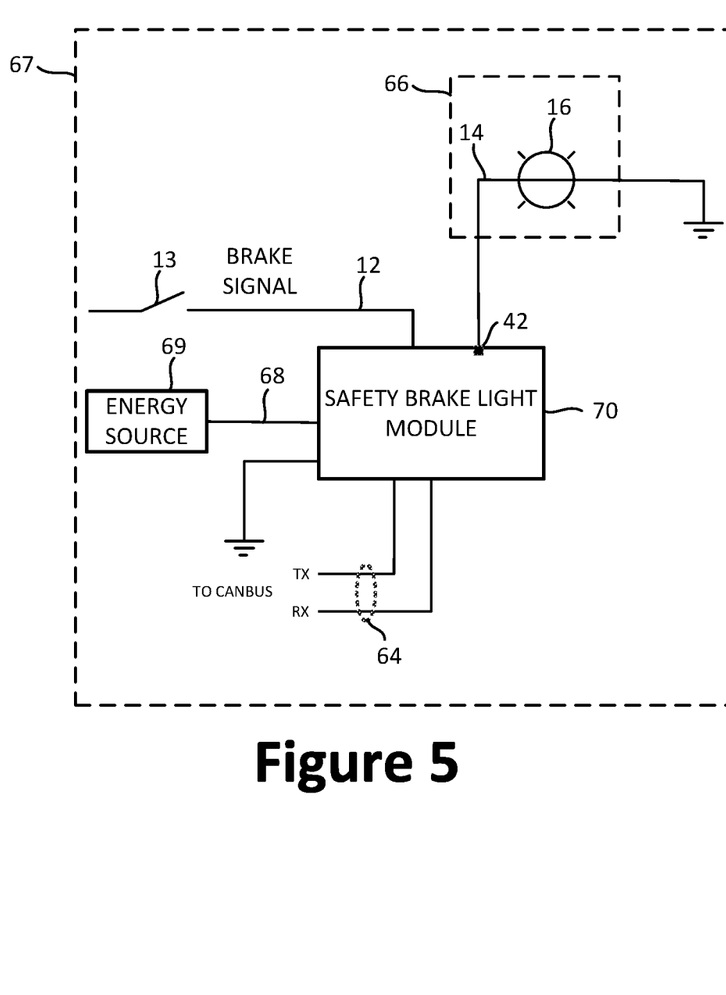
FIG. 5 is a block diagram of a safety brake light module remote from the housing including the safety brake light.

FIG. 5 is a block diagram showing a safety brake light module 70 electrically coupled to a vehicle brake actuator 13 which is coupled to a signal conductor 12, to an energy source 69 via a power conductor 68, to ground, to safety brake light signal conductor 14, and to the CANbus. A dashed box represents a vehicle 67 comprising safety brake light module 70. Safety brake light module 70 is similar to safety brake light module 62 except that, as described with reference to FIG. 6, microprocessor 30 is powered continuously and not intermittently based on braking. Connection to the CANbus via CANbus cable 64 is shown. The illumination pattern is communicated over safety brake light signal conductor 14 to safety brake light 16 located in housing 66 remotely from safety brake light module 70. An advantage of the present embodiment is that a controller, such as microprocessor 30, can function continuously to process data obtained from the CANbus and thus illumination patterns can be configured which are not possible without a continuous power supply. In a variation of the present embodiment, safety brake light module 70 is positioned in housing 66.

Figure 6:
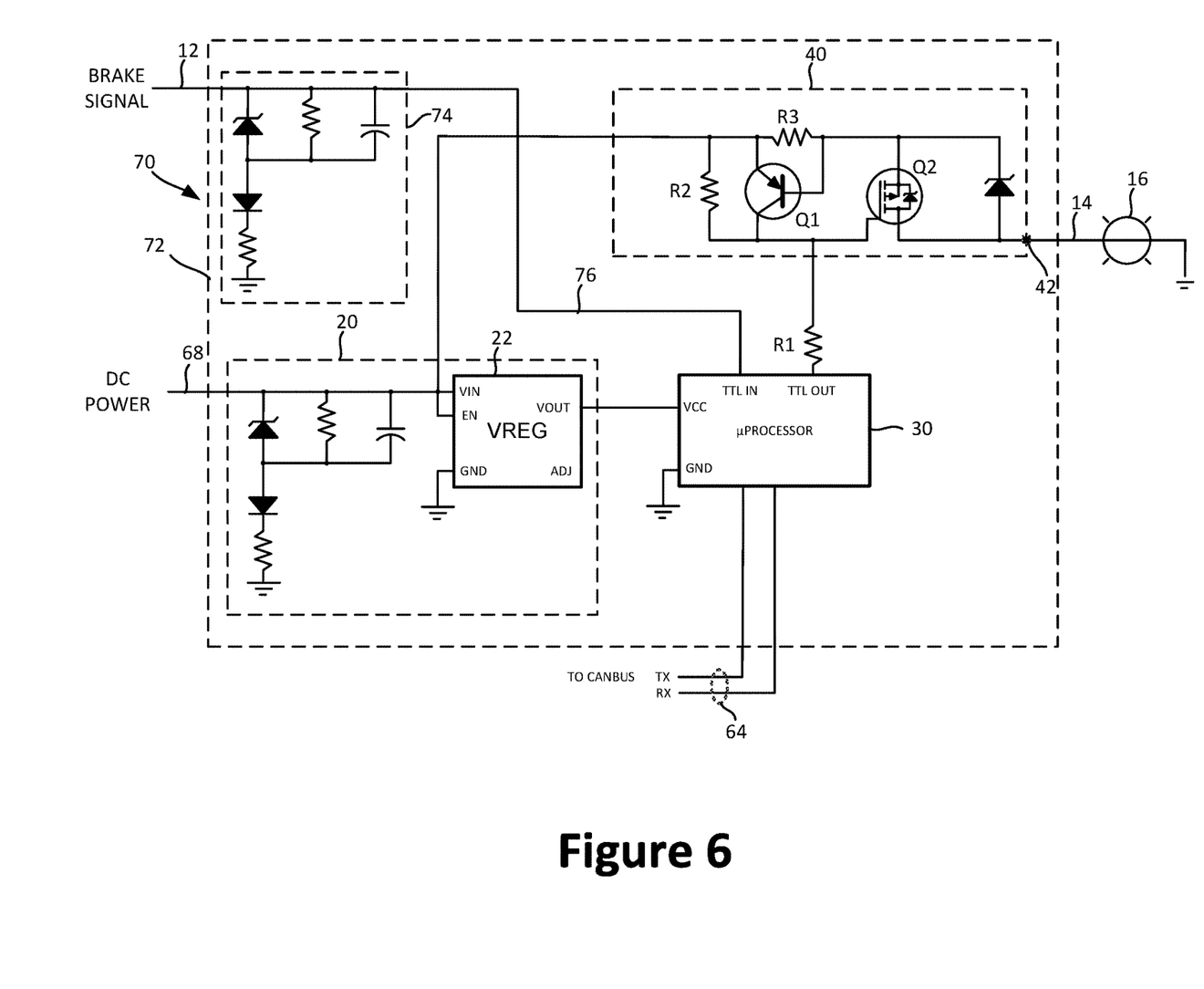
FIG. 6 is a schematic diagram of a further embodiment of a safety brake light module.

FIG. 6 is a schematic diagram of a further embodiment of a safety brake light pulsation module, denoted by numeral 70, communicatively coupled to the CANbus. Safety brake light pulsation circuit 70 comprises a safety brake light pulsation circuit 72. Safety brake light pulsation circuit 72 is similar in functionality and structure to safety brake light pulsation circuits 10 and 50, which may also comprise modules as described herein, except for the addition of an additional conditioning circuit 74 coupled to brake signal conductor 12 and to an input TTL IN of microprocessor 30 by a brake signal input conductor 76. Microprocessor 30 is powered continuously via power conductor 68 and not intermittently based on braking. Braking is indicated via brake signal input conductor 76 rather than by the presence or absence of power. The illumination pattern is communicated over safety brake light signal conductor 14 to safety brake light 16. An advantage of the present embodiment is that a controller, such as microprocessor 30, can function continuously to process data obtained from the CANbus and thus illumination patterns can be configured which are not possible without a continuous power supply. Conditioning circuit 74 may comprise a Zener diode to limit the output voltage, and a resistor/capacitor pair to absorb voltage spikes and stabilize the voltage output.

Figure 7:
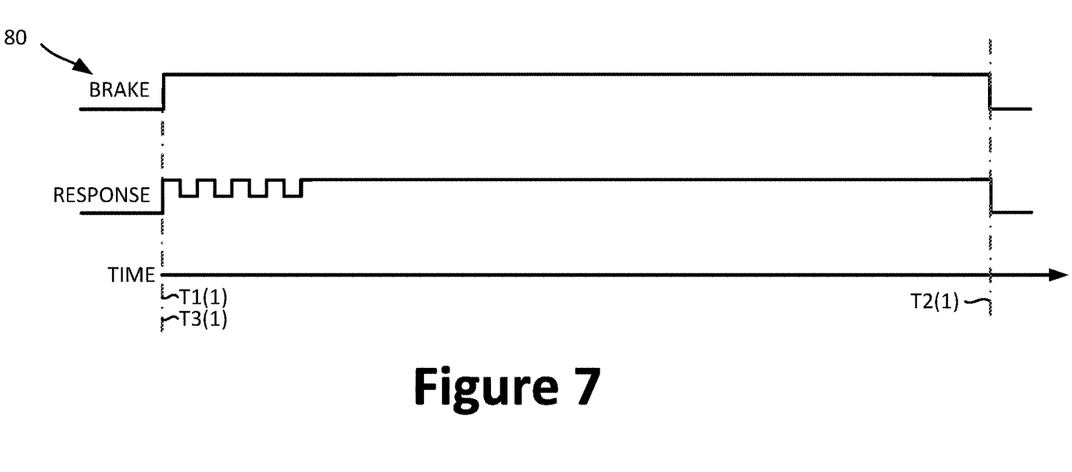
FIGS. 7 and 8 are timing graphs of brake signals and a response signals generated with a brake light pulsation circuit.
Figure 8:
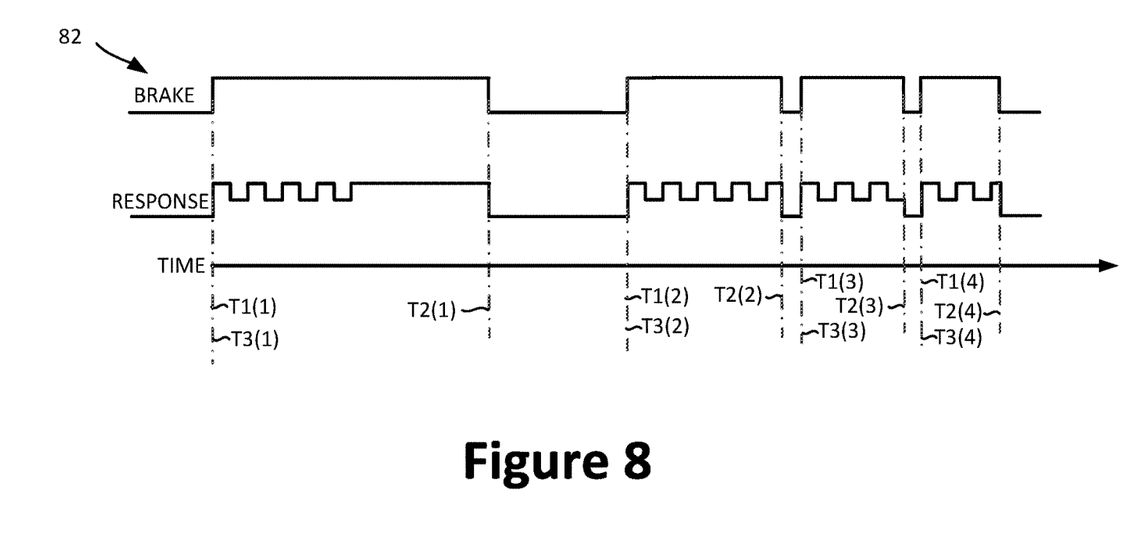

FIGS. 7 and 8 are timing graphs 80, 82 of brake signals and response signals generated with a safety brake light pulsation circuit, illustratively an appropriately programmed safety brake light pulsation circuit 10. The response signals are provided by safety brake light circuit 10 via safety brake light signal conductor 14 and comprise illumination patterns generated by processing instructions embedded in a controller, which may be microcontroller 30 or any other processing device. The controller may be programmable by a user. The user may program the controller by selecting from pre-defined illumination patterns or by configuring a new illumination pattern. The safety brake light module may comprise a programming interface to facilitate programming by the user. Example programming interfaces include mechanical actuators, wireless transceivers, and electrical connectors. The electrical connectors and wireless transceivers are configured to couple the controller to a processing device including an application with a graphical user interface configured to facilitate such programming.

In the figures, T1 signifies application of the brakes and T2 signifies release of the brakes. T3 corresponds to the start of the illumination pattern (allowing for signal transmission delays, which are immaterial). Timing graph 80 shows that, responsive to the application of the brakes at time T1(1), an illumination pattern is generated by the controller comprising a first portion including four pulses and a second portion comprising constant intensity. The number of pulses is programmed or programmable. More or less than four pulses may be included in the illumination pattern. In the present example, each pulse is about a second long. The brakes are released at time T2(1). The number in parenthesis represents a braking event. There may be multiple braking events illustrated in one graph. Timing graph 82 illustrates how the illumination pattern is applied when braking is applied and released in short bursts, e.g. four braking events. The brakes are applied at times T1(1)-(4) and released at times T2(1)-(4), and the illumination patterns begin for each braking event at T3(1)-(4). The second braking event ends shortly after the second (constant intensity) portion of the illumination pattern begins, and in the third and fourth braking events the brakes are released during the first portion of the illumination pattern. As a result, the second, third and fourth braking events appear to a driver following the vehicle as a continuous sequence of pulses.

With reference to FIGS. 7 and 8, the controller is wired to become active upon the application of energy, which occurs when the brakes are applied in some embodiments. Once active, the controller implements processing instructions configured to generate the TTL OUT signal. The TTL OUT signal is binary. In one variation, the TTL OUT signal is high, or active, for half of the duration of a pulse and low or inactive for the other half of the duration. The controller tracks time and upon the passage of a first predetermined time toggles the TTL OUT signal. Upon the passage of a second predetermined time the controller toggles the TTL OUT signal again to complete a pulse. A logic counter counts the pulses and when a predetermined number of pulses is reached, e.g. four, the TTL OUT signal is maintained so that light device 16 illuminates at a constant high level determined by power circuit 40. Power circuit 40 is configured such that the light intensity alternates between a high level ("on") and a low level. Although the low level is generated by an "off" instruction in the controller, the low level is still high enough to be perceived by the human eye, so that a following driver will see the light device pulse but the light will always be on, albeit at different intensity levels, during braking.

Each portion of a pulse (the "on" and "off" portions) can also be comprised of a rapid pulse train to pulse width modulate (PWM) light device 16. The "on" portion of the pulse can be modulated with a high (>50%) duty cycle and the low portion can be modulated with a low (<50%) duty cycle. The rapid PWM pulses are perceived by the human eye as a constant high, or low, intensity, because the human eye cannot perceive the PWM pulsations.

Figure 9:
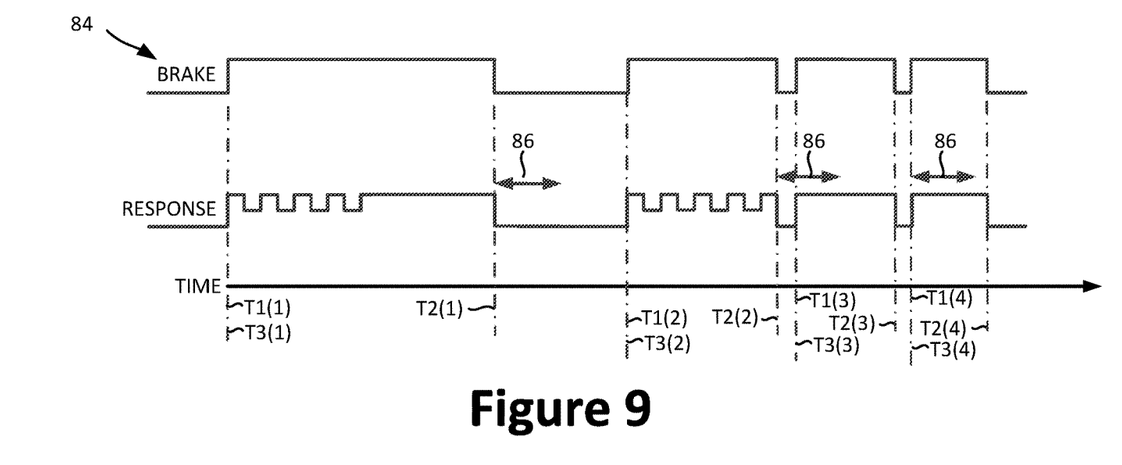
FIGS. 9, 10, 11, and 12 are timing graphs of brake signals and a response signals generated with additional brake light pulsation circuits set forth below.

FIG. 9 presents a timing graph 84 of a brake signal and a response signal generated by a controller of the present invention. Graph 84 illustrates the effect of processing instructions in the controller configured to void the first portion of the illumination pattern if a subsequent braking event is initiated within a first predetermined time duration, e.g. "no-pulse period", 86. In other words, if the time between sequential braking events exceeds first predetermined time duration 86, the pulsation portion and the constant portion of the illumination pattern will be generated, but if the time between sequential braking events does not exceed first predetermined time duration 86, only the constant portion of the illumination pattern will be generated. The first portion of the illumination pattern (the pulsation portion) is shown beginning at T3(1) and T3(2), because the passage of time between T2(1) and T1(2) is greater than first predetermined time duration 86. However, the same is not true at T1(3) and T1(4), therefore the pulsation portion of the illumination pattern is voided and only the second portion of the illumination pattern (constant illumination) is shown at T3(3) and T3(4). In contrast with graph 82, the illumination pattern shown in graph 84 is not perceived as a continuous pulsation when the driver "taps" the brakes at T1(3) and T1(4), except if the driver releases the brake quickly. The first and second portions are illustratively described as pulsating and constant, however it should be understood that the second portion of the illumination pattern may vary in intensity without forming a pulsating pattern without deviating from the teachings of the present disclosure.

Figure 10:
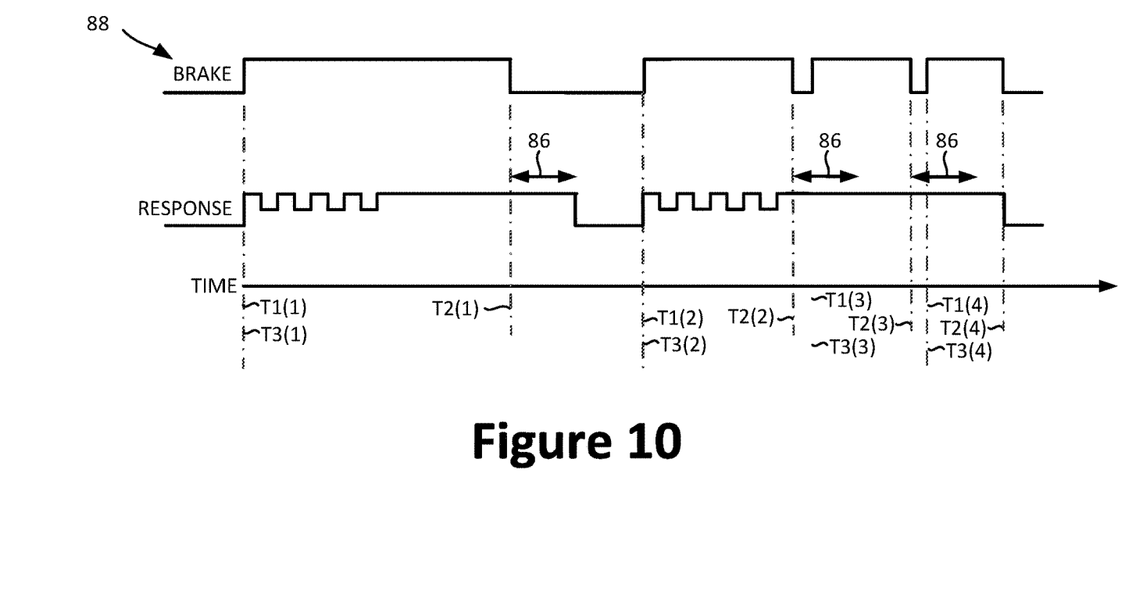

FIG. 10 presents a timing graph 88 of a brake signal and a response signal generated by a controller of the present invention such as the controller in module 70, in which the controller remains powered when the brake is released and receives a brake signal when the brake is applied that is independent of the power signal. Graph 88 illustrates the effect of processing instructions in the controller configured to void the first portion of the illumination pattern if a subsequent braking event is initiated within a predetermined no-pulse period 86. Thus, the first portion of the illumination pattern (the pulsation portion) is shown beginning at T3(1) and T3(2), because the passage of time between T2(1) and T1(2) is greater than the predetermined no-pulse period 86. However, the same is not true at T1(3) and T1(4), therefore the pulsation portion of the illumination pattern is voided and only the second portion of the illumination pattern (constant illumination) is shown at T3(3) and T3(4). Additionally, in contrast with graph 84, the illumination pattern is maintained for the duration of predetermined no-pulse period 86. This illumination pattern is due to recognition that after the brake is released after the vehicle stops a small amount of time passes before the vehicle begins its forward motion, and this delay is dependent on the mass of the vehicle and the pressure on the accelerator. Different vehicles and drivers may thus accelerate at different rates after the brake is released. If the safety brake light is immediately extinguished, the following driver may advance faster than the vehicle, resulting in a collision. On the other hand, if the safety brake light is maintained briefly after the brake is released, the collision may be avoided. Even further, the avoidance of a small pulse when the driver quickly presses and releases the brake (such as between T2(2) and T1(3) in graph 84) will prevent the following driver from "anticipating" forward movement that may cause the collision. As shown, predetermined no-pulse period 86 is about two-seconds in duration. The present embodiment may also be implemented with safety brake light circuits including energy storage 54, such as safety brake light circuits 50 and 60, by further connecting energy storage 54 to the node between resistors R2 and R3 to energize power circuit 40. Thus, the second portion of the illumination pattern will remain until the energy of energy storage 54 is depleted.

Figure 11:
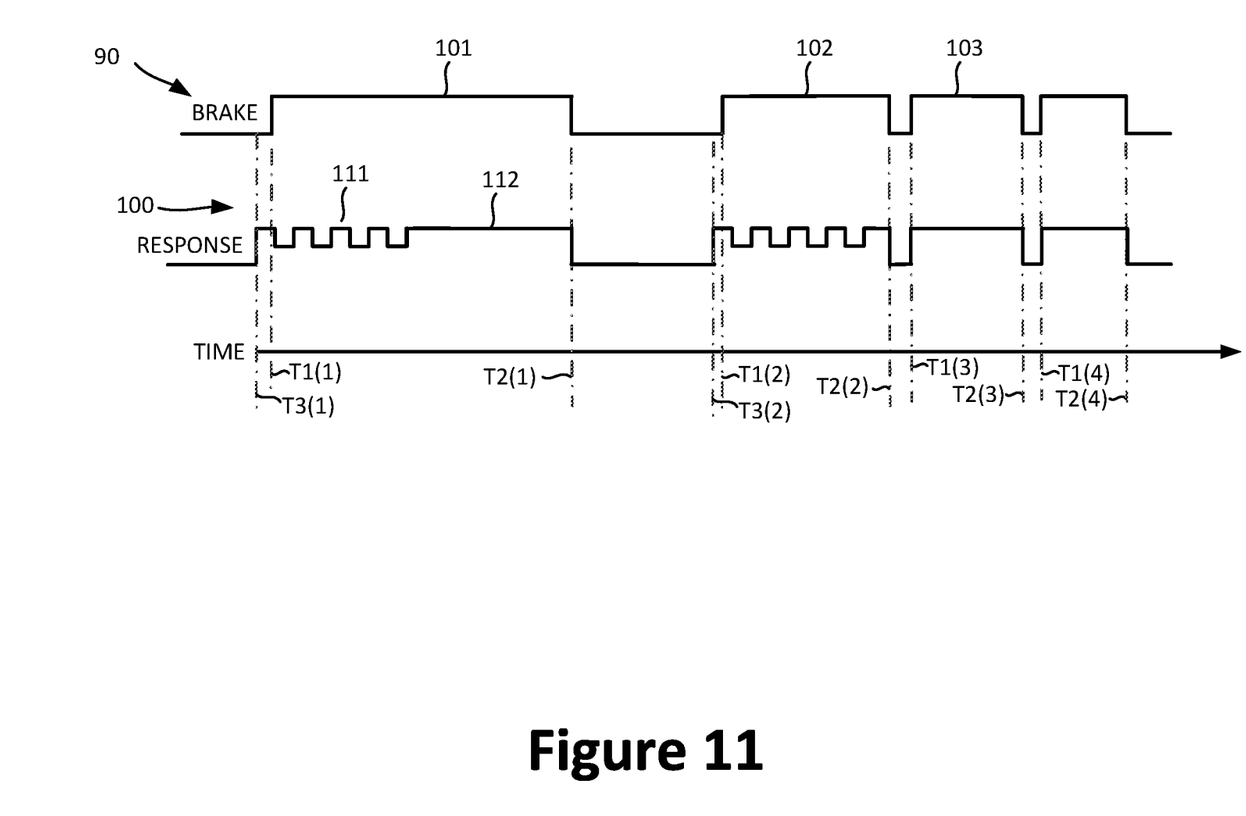

FIG. 11 presents a timing graph 90 of a brake signal and a response signal generated by a controller of the present invention such as the controller in module 70, in which the controller remains powered when the brake is released and receives a brake signal when the brake is applied that is independent of the power signal. A first braking event 101, a second braking event 102, and a third braking event 103 are shown. Also shown are first and second portions 111, 112 of an illumination pattern 110. As shown, graph 90 illustrates the effect of processing instructions in the controller configured to void the first portion of the illumination pattern, as described with reference to FIG. 9. Any other pulsation avoidance mechanism may also be used, such as the mechanism described with reference to FIG. 10. Additionally, graph 90 shows that the illumination pattern leads the brake signal by a time duration corresponding to the difference between T3 and T1. This time duration represents a predetermined deceleration has been determined by the controller, either by analysis of input signals from an accelerometer or from the CANbus, or by reading of a signal from the CANbus correlated to a high deceleration event, e.g. speed signals, tilt signals, and any other signals indicative of deceleration or collision. Accordingly, the safety brake light begins to pulse even before the brakes are applied. The difference between T1 and T3 in the second braking event is smaller than between T1 and T3 in the first braking event to illustrate that the illumination pattern leads the brake signal by an amount that is not predetermined, it is responsive to an input signal independent of the braking signal.

In a further embodiment of the disclosure, the processing instructions of the controller provide a first pattern upon application of the brakes (equivalent to the first portion of the illumination pattern described above), a second pattern after the first pattern, and a third pattern after the second pattern. The second and third patterns alternate repeatedly and continuously so long as braking remains. In one example, the second pattern has constant intensity, while the pulsing frequency of the third pattern differs from the pulsing frequency of the first pattern. In another example, the second pattern has constant intensity, while the pulsing intensity of the third pattern differs from the pulsing intensity of the first pattern.

In a variation of the preceding embodiment, a user can modify the first, second, and third patterns using any known user interface. Example user interfaces include buttons provided on the safety brake light module, and wireless communications via a processing device such as a computer, smart phone, or tablet. In one example, several pattern combinations are programmed and the user cycles through them sequentially by pressing the button. In another example, a safety brake light module application running on a processing device communicatively coupled to the safety brake light module can be used to select or modify the patterns. The application may have limits necessary to ensure regulatory compliance. For example, the limits may include duration and intensity of the pulses in the first pattern. The limits may include a minimum intensity for any pattern, so that the safety brake light is always on when the brakes are applied.

Figure 12:
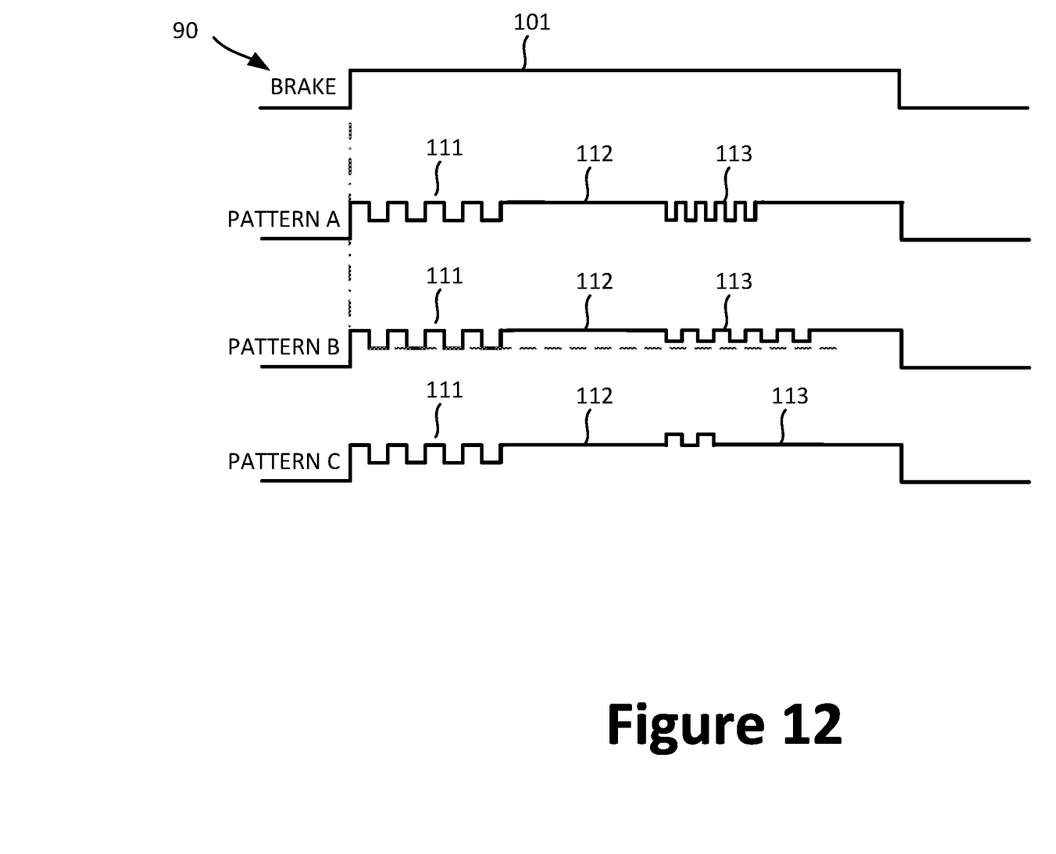

FIG. 12 presents a timing graph 90 of first braking event 101 and patterns A, B, C corresponding to different illumination patterns comprising a first, second, and third portions 111, 112, and 113, respectively. In pattern A third portion 113 has a higher pulsing frequency than first portion 111. In pattern B third portion 113 has a higher low intensity value than first portion 111. In pattern C third portion 113 has a higher high intensity value than first portion 111 and fewer pulses. Patterns A, B, and C are examples to illustrate the structure of signals to generate illumination patterns that may be predefined in the controller or configured by the user.

The embodiments described above provide several safety brake light module configurations. In another embodiment, the processing instructions described above are embedded in an existing ECU of the vehicle. The illumination pattern is thus generated by a safety brake light signal imposed on brake light conductor 12. The present embodiment can advantageously be introduced during the manufacture of the vehicle rather than by modification of the vehicle after manufacture.

Unless otherwise expressly stated in connection with a specific use thereof, the term "device" includes a single device, a plurality of devices, two components integrated into a device, and any variations thereof. The singular form is only used to illustrate a particular functionality and not to limit the disclosure to a single component. Therefore, the term "memory device" includes any variation of electronic circuits in which processing instructions executable by a processing device may be embedded unless otherwise expressly stated in connection with the specific use of the term. For example, a memory device includes read only memory, random access memory, a field programmable gate array, a hard-drive, a disk, flash memory, and any combinations thereof, whether physically or electronically coupled. Similarly, a processing device includes, for example, a central processing unit, a math processing unit, a plurality of processors on a common integrated circuit, and a plurality of processors operating in concert, whether physically or electronically coupled. Furthermore and in a similar manner, the term "application" includes a single application, a plurality of applications, one or more programs or subroutines, software, firmware, and any variations thereof suitable to execute instruction sequences with a processing device. Furthermore and in a similar manner, the term "unit" denotes a functional unit and the term includes a single unit, a plurality of units, and one or more components arranged in a common enclosure or in a distributed manner.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples). Thus, particular implementations of the invention have been described. Other implementations are within the scope of the following claims. In some cases, actions recited in the claims may be performed in a different order and still achieve desirable results. In addition, the depictions in the accompanying figures do not necessarily require a particular order or sequential order.

What is claimed is:

1. A safety brake light module configured to energize a safety brake light of a vehicle, the safety brake light module comprising:
   a voltage regulation circuit including a voltage regulator;
   a controller powered by the voltage regulation circuit;
   a power circuit including a power switch communicatively coupled to the controller, the power circuit having an output node adapted to be electrically coupled to the safety brake light;
   the controller comprising processing instructions configured to generate a safety brake light signal at the output node of the power circuit, the safety brake light signal configured to cause the safety brake light to illuminate in an illumination pattern based thereon, wherein:
      during a first braking event resulting from actuation of a vehicle brake actuator by a user of the vehicle the illumination pattern comprises a first portion consisting of a pulsing portion, a second portion consisting of a constant portion following the pulsing portion, and a third portion following the second portion, the third portion being different from the first portion and the second portion, and
      during a second braking event the illumination pattern comprises the pulsing portion and the constant portion following the pulsing portion when a time duration between the first braking event and the second braking event exceeds a first predetermined time period, and the illumination pattern comprises only the constant portion when the time duration between the first braking event and the second braking event does not exceed the first predetermined time period,
   wherein the third portion is programmable by the user via the controller.

2. The safety brake light module of claim 1, wherein the voltage regulation circuit is configured to be electrically coupled to a brake signal conductor of the vehicle to receive energy therefrom when the vehicle brake actuator is actuated by the user.

3. The safety brake light module of claim 2, further comprising an energy storage circuit coupled to the voltage regulation circuit and receiving electrical energy therefrom, the controller configured to determine a voltage of the energy storage circuit and determine based on the voltage the time duration elapsed between the first braking event and the second braking event.

4. The safety brake light module of claim 3, wherein the energy storage circuit comprises a resistor and a non-electrolytic capacitor defining an RC value of the energy storage circuit.

5. The safety brake light module of claim 4, wherein the controller is de-energized between the first braking event and the second braking event.

6. The safety brake light module of claim 1, wherein the voltage regulation circuit is configured to be electrically coupled to an energy source independent of the brake signal conductor of the vehicle.

7. The safety brake light module of claim 6, further comprising a conditioning circuit configured to be electrically coupled to a brake signal conductor of the vehicle and electrically coupled to the controller, wherein the conditioning circuit converts a braking event signal transmitted via the brake signal conductor to a conditioned braking event signal which the controller uses to generate the safety brake light signal.

8. The safety brake light module of claim 1, wherein the controller is configured to be communicatively coupled to a vehicle area network to receive data therefrom representative of the first braking event and the second braking event.

9. The safety brake light module of claim 8, wherein the data includes values of at least one of more parameters selected from deceleration, global position, speed, and brake actuation.

10. The safety brake light module of claim 1, wherein the third portion differs from the first portion in at least one of a high intensity level, a low intensity level, duration, number of pulses, or pulsing frequency.

11. The safety brake light module of claim 1, wherein the safety brake light module comprises a programming interface configured to permit the user to program the third portion of the illumination pattern.

12. The safety brake light module of claim 11, wherein the programming interface comprises a mechanical actuator actuatable by the user to program the third portion by actuating the mechanical actuator to select the third portion from a plurality of predefined third portions.

13. The safety brake light module of claim 11, wherein the programming interface comprises a wireless transceiver operable to pair a processing device and the controller wirelessly, wherein the processing device comprises an application including a graphical user interface provided to enable the user to select one or more of the high intensity level, the low intensity level, the duration, or the pulsing frequency of the third portion.

14. The safety brake light module of claim 1, wherein the controller is configured to receive one or more values of parameters representative of deceleration of the vehicle, the parameters selected from deceleration, global position, speed, and brake actuation.

15. The safety brake light module of claim 14, wherein the controller is configured to receive the one or more values of parameters representative of deceleration from a vehicle area network.

16. A method of operating a safety brake light of a vehicle, the method comprising:
   actuating a vehicle brake actuator of the vehicle; and
   energizing a safety brake light module comprising a controller communicatively coupled to a power circuit having an output node adapted to be electrically coupled to the safety brake light, the safety brake light module causing the safety brake light to illuminate in an illumination pattern, wherein:

during a first braking event resulting from actuation of the vehicle brake actuator by a user of the vehicle the illumination pattern comprises a first portion consisting of a pulsing portion, a second portion consisting of a constant portion following the pulsing portion, and a third portion following the second portion, the third portion being different from the first portion and the second portion, and during a second braking event the illumination pattern comprises the pulsing portion and the constant portion following the pulsing portion when a time duration between the first braking event and the second braking event exceeds a first predetermined time period, and the illumination pattern comprises only the constant portion when the time duration between the first braking event and the second braking event does not exceed the first predetermined time period, wherein the third portion is programmable by the user via the controller.

17. The method of claim 16, wherein the safety brake light module further comprises a voltage regulation circuit and an energy storage circuit coupled thereto to receive electrical energy from the voltage regulation circuit, the method further comprising: the controller determining a voltage of the energy storage circuit and determining based on the voltage the time duration elapsed between the first braking event and the second braking event.

18. The method of claim 17, further comprising de-energizing the controller responsive to the end of the first braking event and re-energizing the controller responsive to the start of the second braking event.

* * * * *